(12) United States Patent
Agashe et al.

(10) Patent No.: US 6,430,415 B1
(45) Date of Patent: Aug. 6, 2002

(54) METHOD AND APPARATUS FOR LOCATING GPS EQUIPPED WIRELESS DEVICES OPERATING IN ANALOG MODE

(75) Inventors: Parag A. Agashe; Samir S. Soliman; Alkinoos Hector Vayanos, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/280,337

(22) Filed: Mar. 29, 1999

(51) Int. Cl.[7] .............................. H04Q 7/20; G01S 3/04
(52) U.S. Cl. .................. 455/456; 455/67.1; 342/357.1; 342/357.08
(58) Field of Search ................................ 455/427, 428, 455/429, 12.1, 456, 426, 457, 67.1; 370/316; 342/357.02, 357.06, 357.08, 357.09, 357.1, 357.12

(56) References Cited

U.S. PATENT DOCUMENTS 5,365,450 A * 11/1994 Schuchman et al. ........ 364/449
5,835,907 A * 11/1998 Newman ..................... 455/456
5,945,944 A * 8/1999 Krasner .................. 342/357.06
6,112,054 A * 8/2000 Kita ........................... 455/428
6,150,980 A * 11/2000 Krasner .................... 342/357.1
6,185,427 B1 * 2/2001 Krasner et al. ............. 455/456
6,222,483 B1 * 4/2001 Twitchell et al. ........... 455/456

* cited by examiner

Primary Examiner—Lester G. Kincaid
(74) Attorney, Agent, or Firm—Philip Wadsworth; Charles Brown; Kevin Cheatham (57) ABSTRACT

An apparatus and method for locating a remote station operating in analog mode, and that may not have a sense of network time, using an inverted GPS approach. The invention also enables remote stations operating in analog mode that do not know true GPS time to determine their own location. A time stamp, reflecting the approximate time a satellite range measurement is made, is assigned to the measurement at either the remote station or elsewhere in the network. The difference between true GPS network time and the measurement time is treated as a variable "error" in measurement, the length of which is unknown. This variable error is determined and used in determining the physical location of the remote station.

20 Claims, 8 Drawing Sheets

METHOD AND APPARATUS FOR LOCATING GPS EQUIPPED WIRELESS DEVICES OPERATING IN ANALOG MODE

BACKGROUND OF THE INVENTION

1. Field of the Invention

Generally, the present invention relates to communication networks. More specifically, the invention relates to an apparatus and method for determining the physical location of a mobile telephone within a cellular communication network.

2. Description of the Related Art

Recent developments in global positioning satellite networks (GPS) and terrestrial mobile communications make it desirable to integrate GPS functionality into a mobile communication device, such as a mobile telephone, more generally referred to herein as a remote station, in order to support various position location functions and features. A wireless link exists between a mobile communication device within a terrestrial mobile communications system and a base station within the communications system. A base station is typically a stationary communication device that receives wireless communications from, and transmits wireless communications to, a wireless mobile communication device. The base station also communicates with communication networks to complete the connection between the mobile communication device and an end-point device, such as another mobile communication device, a conventional telephone, a computer or any other such device. This wireless link may be used to communicate position location information between the mobile communication device and the base station in order to improve the performance of the GPS receiver within the mobile communication device. In particular, certain functions that must be performed in order to locate the position of a mobile communication device in accordance with a GPS system can be performed by the base station, rather than by the communication device. By "off-loading" some of the functions to the base station, the complexity of the communication device can be reduced. Furthermore, since the base station is stationary, the location of the base station can be used to assist in locating the position of the communication device.

Many services, such as CDMA Tiered Services (described in industry standard TR45.5.2.3/98.10.xx.xx, CDMA Tiered Services Stage 2 Description, Version 1.1, published by the Telecommunication Industry Association/Electronics Industry Association (TIA/EIA)), require a wireless telephone to be capable of determining its location while in an idle state. The location must then be displayed to the user. In the idle state, the wireless telephone monitors transmissions from a base station over a control channel broadcast by the base station. For example, in an industry standard IS-95 CDMA system (as defined by industry standard IS-95, published by the TIA/EIA), the base station transmits a paging channel. Each of the telephones capable of receiving signals from a particular base station will monitor information broadcast on the control channel to determine whether incoming calls or other data are intended for that telephone.

A GPS receiver typically measures the range to at least four GPS satellites. If the locations of the satellites and the ranges from the phone to the satellite are known at the time the measurement is made, then the location of the phone can be computed. Since GPS satellites orbit around the Earth, the relative position of the GPS satellites with respect to the earth changes with time. The location of a GPS satellite can be determined by having a description of the orbit of the satellite along with the time when the satellite position is to be computed. The orbits of GPS satellites are typically modeled as a modified elliptical orbit with correction terms to account for various perturbations.

Certain methods for computing the location of a device require measuring the ranges to the satellites at the wireless phone, and then transmitting these ranges to a server connected to the base station. The base station uses these ranges, along with the locations of the satellites at the time the range measurements were made, to compute the location of the phone. This computed location may be displayed to the user or sent to any other entity that needs the location. This method is suitable for a phone that has a dedicated traffic channel. However, the method is not suitable for phones in the idle state, because the phone lacks a dedicated traffic channel over which to send the information to the base station during the idle state.

In the absence of a dedicated traffic channel over which to communicate with the base station, the phone may use a shared access channel to send information to the base station. However, transmitting measured ranges to the base station over a shared access channel, a channel commonly used to establish a call to or from the phone, can have a significant impact on the capacity of the shared access channel and on the life of the battery that powers the phone. Hence, it is not practical to transmit measured ranges to the base station. In this case, the phone must compute its own location. To do so, the phone must know the locations of the GPS satellites, and the errors in the GPS satellite clock, because an accurate GPS satellite clock is required to determine the range measurements accurately. This information is transmitted to the phone over the control channel. However, even transmitting this information to the phone creates a significant burden on the control channel.

Under conventional conditions, the control channel has to carry large amounts of access information. The control channel has a very limited capacity to carry messages. Hence, it is not possible to convey extensive GPS information over the control channel. Furthermore, the information must be transmitted in a form that allows the information to be used for a relatively long time after it has been received.

These problems and deficiencies are recognized and solved by the present invention in the manner described below. The invention is compatible with CDMA modulation systems and the techniques used in telecommunication systems servicing large numbers of system users. A more robust discussion of CDMA systems and techniques in this type of multiple access communication systems may be found in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein. Further, the invention ideally would be adaptable to other modulation systems and techniques used in other communication systems, such as time division multiple access (TDMA), frequency division multiple access (FDMA), and amplitude modulation (AM) schemes.

SUMMARY OF THE INVENTION

Broadly, the present invention relates to locating a remote station in a communication network employing wireless links. More specifically, the invention uses an inverted GPS approach to locate remote stations that may not have a sense of network time. The invention also enables remote stations that do not know true GPS time to determine their own location.

In one embodiment, the present invention provides a method to solve this problem by time stamping the approximate time a satellite range measurement is made. This timestamp is assigned at either the remote station or elsewhere in the network. The difference between true GPS network time and this measurement time is treated as a variable "error" in measurement, the length of which is unknown. However, the method of the present invention allows this variable to be determined and used to find the physical location of the remote station.

Of course, the time stamp assigned to the measurements may have a significant error: a few seconds or more. This error will result in an error in the computed location of the remote station. By treating the error in measurement time stamp as an unknown, and solving for this unknown, an accurate location for the remote station can be computed in spite of the erroneous time stamp. This requires that one additional satellite measurement, over the four satellite measurements used for traditional methods, be made.

In another embodiment, the invention provides an article of manufacture containing digital information executable by a digital signal processing device and used to determine the location of the remote station described above. In another embodiment, the invention yields an apparatus used to determine the location of the remote station. The apparatus may comprise a remote station and at least five satellites that include transceivers used, in part, to transmit signals to the remote station. The apparatus may also include at least one base station that has, among other things, a transceiver used to communicate signals to the remote station. These signals include a timing signal used to establish a reference network time. Obviously, to receive signals, the remote station also includes a transceiver communicatively coupled to the base station and satellites, adapted to receive the satellite signals. The apparatus will also include a digital processing apparatus, such as a microprocessor, that is communicatively coupled to the network or one of its component parts.

The invention provides its users with numerous advantages. One advantage is that it speeds up the process of locating a remote station. Another advantage is that the location of the remote station may be determined even if the remote station does not have an estimate of network time. The invention also provides a number of other advantages and benefits that should become even more apparent after reviewing the following detailed descriptions of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF THE PREFERRED EMBODIMENTS

FIGS. 1 through 8 illustrate examples of various method and apparatus aspects of the present invention. For ease of explanation, but without any limitation intended, these examples are described in the context of a digital telecommunication network incorporating wireless links, one example of which is described below.

APPARATUS COMPONENTS AND INTERCONNECTIONS

A general discussion concerning the processing of signals for transmission in telecommunication system may be found Electronic Industry Association standard TIA/EIA/IS-95-A entitled "Mobile Station-Based Station Compatibility Standard for Dual-Mode Wideband Spread Spectrum Cellular Systems, incorporated by reference herein, and other transmission standards well known in the art.

Figure 1:
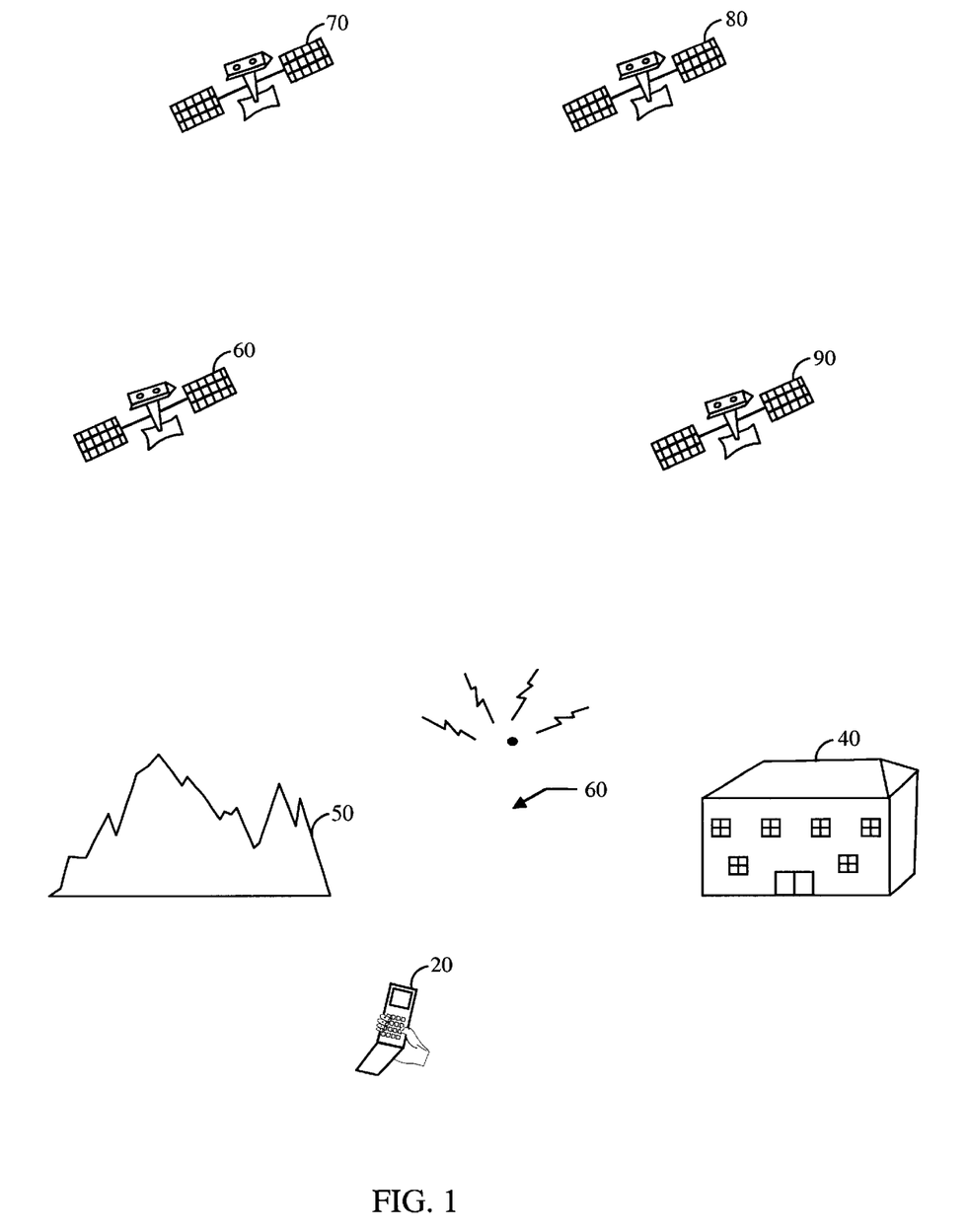
FIG. 1 is a diagram showing an illustrative implementation of a base station and remote station of a synchronized communication system.

FIG. 1 is a diagram showing an implementation of a base station 10 and a remote station 20 in a synchronous CDMA communication network. The network is surrounded by buildings 40 and ground based obstacles 50. The base station 10 and remote station 20 are disposed in a GPS environment having several GPS satellites, of which four are shown 60, 70, 80 and 90. Such GPS environments are well known; for example, see for example Hofmann-Wellenhof, B., et al., GPS Theory and Practice, Second Edition, New York, N.Y.: Springer-Verlag Wien, 1993. In a typical prior art GPS application, at least four satellites are required in order for a GPS receiver to determine its position. In contrast, the present invention provides a method and apparatus for determining the position of a remote station 20 using signals from as few as one GPS satellite and, in the simplest case, two other terrestrial based signals.

Figure 2:
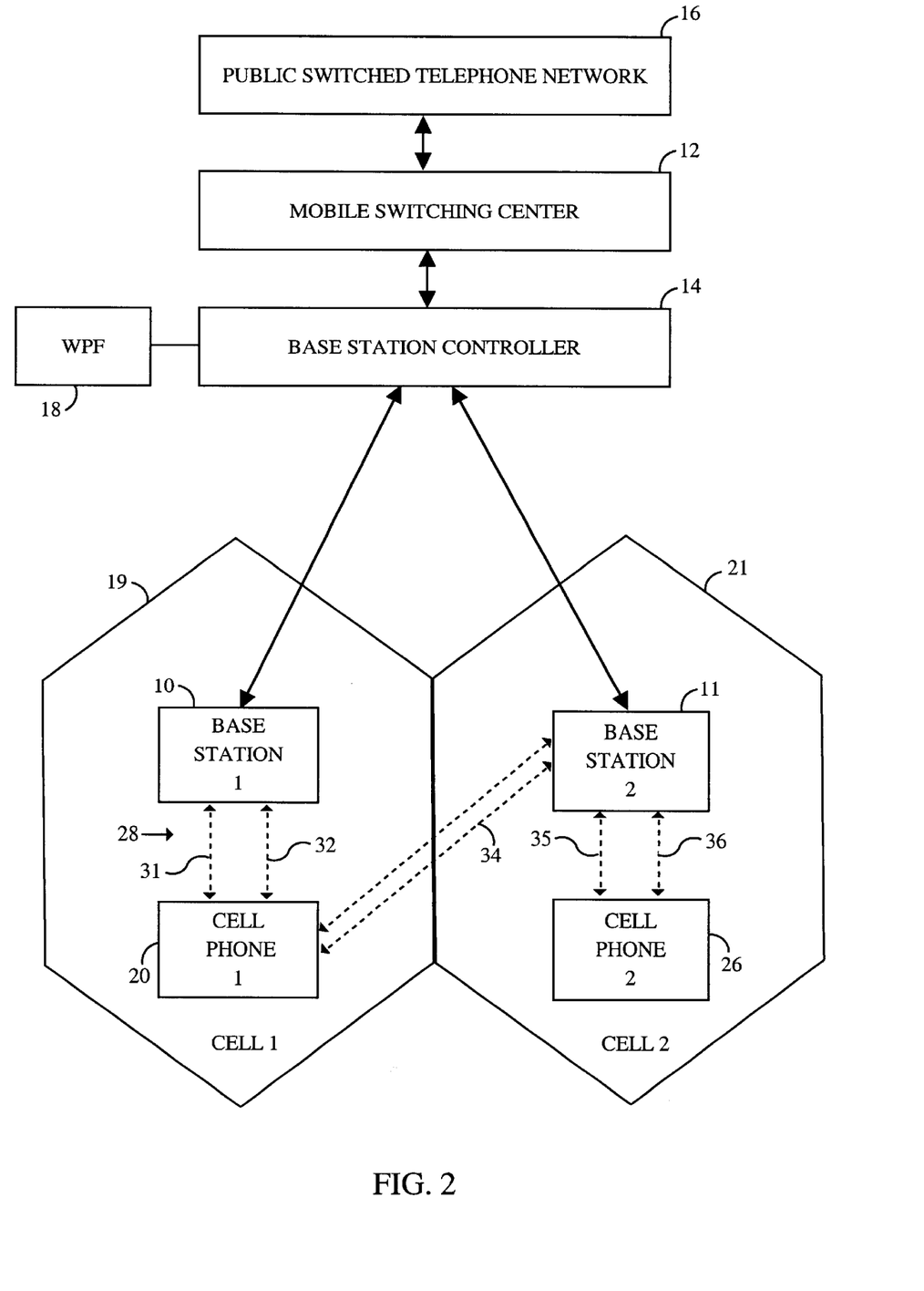
FIG. 2 is a block diagram of an exemplary CDMA cellular telephone system.

FIG. 2 shows a block diagram of a CDMA network 30. The network 30 includes a mobile switching center (MSC) 12 having a base station controller (BSC) 14. A public switched telephone network (PSTN) 16 routes calls from traditional terrestrial based telephone lines and other networks (not shown) to and from the MSC 12. The MSC 12 routes calls from the PSTN 16 to and from a source base station 10 associated with a first cell 19 and a target base station 11 associated with a second cell 21. In addition, the MSC 12 routes calls between the base stations 10, 11. The source base station 10 directs calls to the first remote station 20 within the first cell 19 via a first communications path 28. The communications path 28 is a two-way link having a forward link 31 and a reverse link 32. Typically, when the base station 10 has established voice communications with the remote station 20, the link 28 includes a traffic channel.

A wireless positioning function (WPF) 18 is shown communicatively coupled to the BSC 14, but may be coupled directly or in-directly to other network elements such as the MSC 12. The WPF 18 generally comprises a digital processing device, storage, and other elements (all not shown) commonly found in such devices. The WPF 18 may be put to a variety of uses, such as estimating the one-way time delay for a signal sent between the base station 10 and the remote station 20, or monitoring and accounting for the time offset between a reference time and a time of arrival of all other signals. The WPF 18 is discussed in fuller detail below.

Although each base station 10, 11 is associated with only one cell, a base station controller often governs or is associated with base stations in several cells. When the remote station 20 moves from the first cell 19 to the second cell 21, the remote station 20 begins communicating with the base station associated with the second cell. This is commonly referred to as a "hand-off" to the target base station 11. In a "soft" handoff, the remote station 20 establishes a second communications link 34 with the target base station 11 in addition to the first communications link 28 with the source base station 10. After the remote station 20 crosses into the second cell 21 and the link with the second cell has been established, the remote station may drop the first communications link 28.

In a hard handoff, the operation of the source base station 10 and the target base station 11 typically are different enough that the communications link 34 between the source base station must be dropped before the link to the target base station can be established. For example, when a source base station is within a CDMA system using a first frequency band and target base station is in a second CDMA system using a second frequency band, the remote station will not be able to maintain links to both base stations concurrently, since most remote stations do not have the ability to tune to two different frequency bands concurrently. When the first remote station 20 moves from the first cell 19 to the second cell 21, the link 28 to the source base station 10 is dropped and a new link is formed with the target base station 11.

Figure 3:
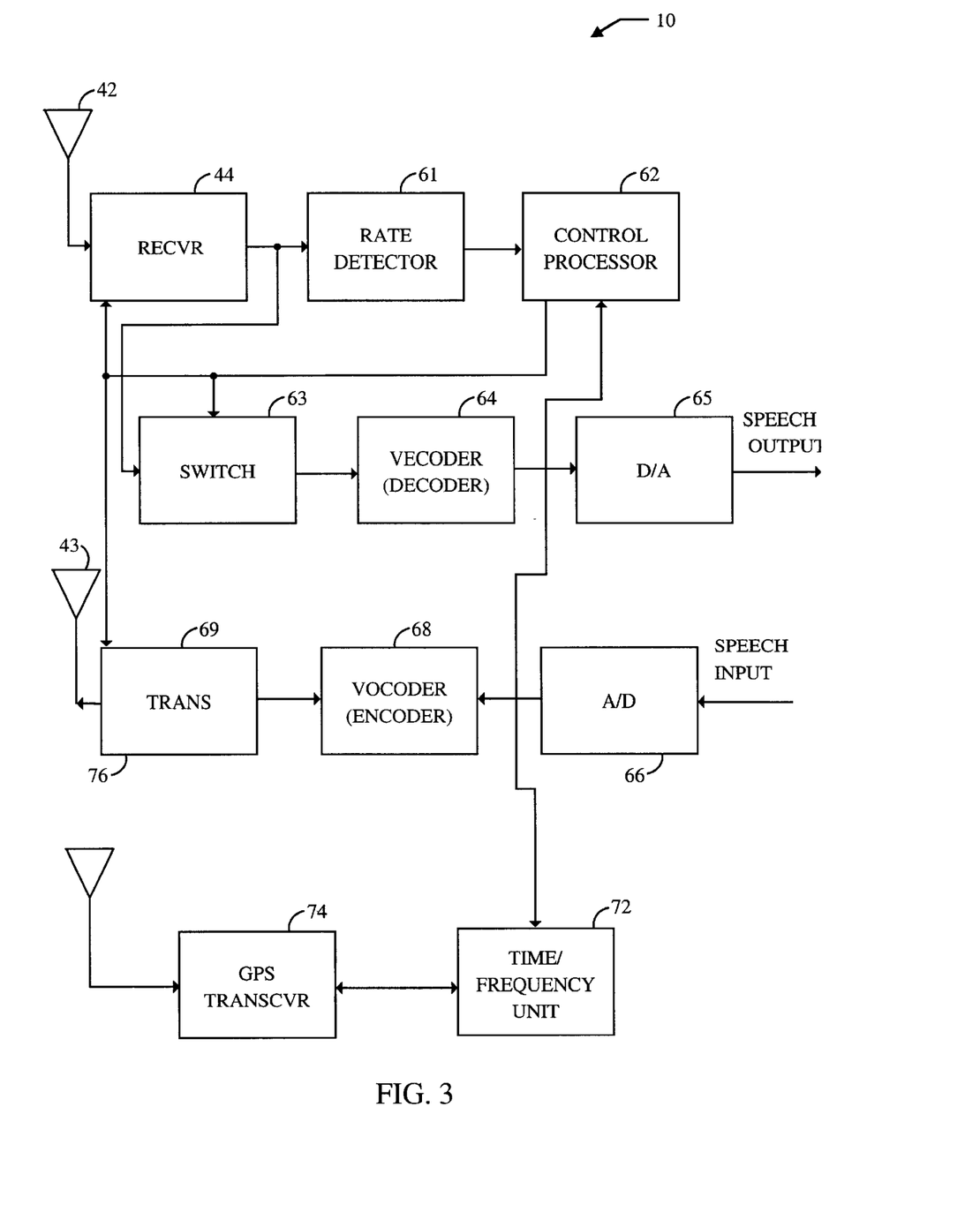
FIG. 3 is a simplified representation of a base station constructed in accordance with the present invention.

FIG. 3 is a simplified representation of a base station 10 in accordance with the present invention. In an alternate embodiment, the base station 10 includes additional functionality that allows the base station to determine the position of a remote station 20, as will become clear from the description provided below. A conventional base station 10 includes a receive CDMA antenna 42 for receiving CDMA signals and a transmit CDMA antenna for transmitting CDMA signals. Signals received by the antenna 42 are routed to a receiver 44. In practice, the receiver 44 includes demodulators, de-interleavers, decoders and other circuits as will be appreciated by those skilled in the art. The received signal is allocated to an appropriate channel for which a rate detector 60 is associated. A control processor 62 uses the rate of the detected signal to detect speech. If speech is detected in a received frame, the control processor 62 switches the received frame to a vocoder 64 via a switch 63. The vocoder 64 decodes the variable rate encoded signal and provides a digitized output signal in response thereto. The digitized de-vocoded signal is converted to speech by a digital-to-analog converter 65 and an output device such as a speaker (not shown).

Input speech from a microphone or other input device (not shown) is digitized by an analog-to-digital converter 66 and vocoded by a vocoder encoder 68. The vocoded speech is input to a transmitter 69. In practice, the transmitter 69 includes modulators, interleavers and encoders as will be appreciated by those skilled in the art. The output of the transmitter 69 is fed to the transmit antenna 43.

Base station 10 is also equipped with a GPS antenna 76, receiver 74 and timing and frequency unit 72. The timing and frequency unit accepts signals from the GPS engine of the GPS receiver and uses them to generate timing and frequency references for the proper operation of the CDMA system. Accordingly, in many such CDMA systems, each cell site uses a GPS time base reference from which all time critical CDMA transmissions (including pilot sequences, frames and Walsh functions) are derived. Such conventional timing and frequency units and GPS engines are common in CDMA systems and are well known in the art. Conventional timing and frequency units provide frequency pulses and timing information. In contrast, the timing and frequency unit 72 of the present invention preferably also outputs the elevation angle, pseudo range, satellite identification (i.e., pseudo noise (PN) offset associated with each satellite) and the Doppler shift associated with each satellite in order to assist the remote station 20 in acquiring the satellites (i.e., decrease the amount of time required to acquire a satellite). This information is typically available within conventional timing and frequency units, but is typically neither needed nor provided to external devices. The additional information provided by the timing and frequency unit 72 may be communicated to the BSC 14 in the same manner as is done with regard to frequency and timing information in a base station.

Figure 4:
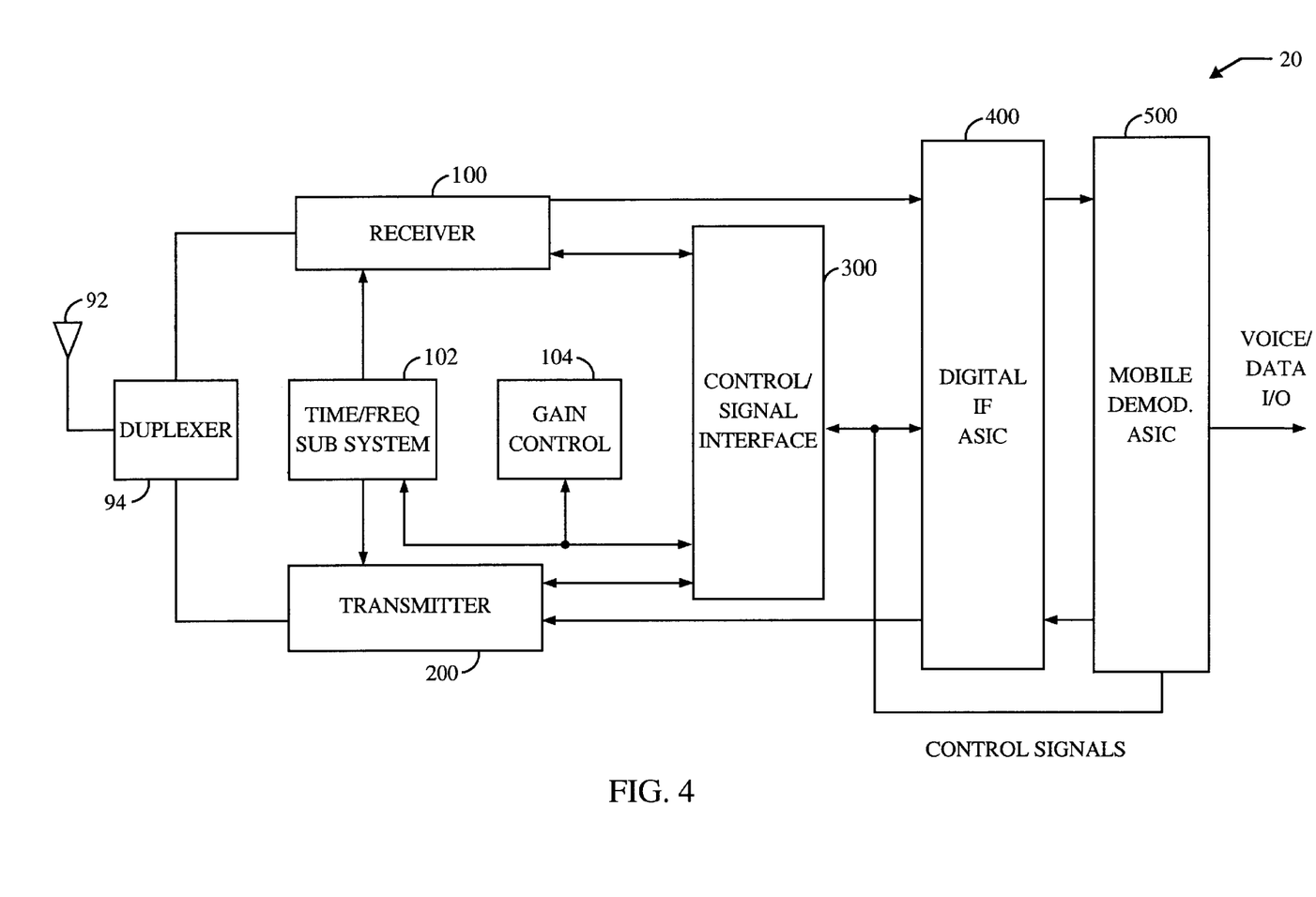
FIG. 4 is a block diagram of the remote station of the system for determining the position of a wireless transceiver of the present invention.

FIG. 4 is a block diagram of the remote station 20 in accordance with one embodiment of the present invention. The remote station 20 preferably includes a bi-directional antenna 92 adapted to receive CDMA transmissions as well as GPS signals. In an alternative embodiment, separate antennas may be used for receiving and transmitting GPS signals, CDMA signals, and other signals, such as alternative system signals. The antenna 92 preferably feeds a duplexer 94. The duplexer 94 preferably feeds a receiver 100 and is preferably fed by a transmitter 200. A time frequency subsystem 102 provides analog and digital reference signals for the receiver 100, a control signal interface 300, and the transmitter 200, as will be appreciated by those skilled in the art. CDMA power control is provided by a gain control circuit 104.

In one embodiment, the control signal interface 300 is a digital signal processor (DSP). Alternatively, the control signal interface may be another circuit capable of performing gain control functions. The control signal interface 300 provides control signals for the remote station 20. The receiver 100 provides for radio frequency (RF) down conversion and a first stage of intermediate frequency (IF) down conversion. A digital IF application specific integrated circuit (ASIC) 400 provides for a second stage of IF to baseband down conversion, sampling and A/D conversion. A mobile demodulator ASIC 500 searches and correlates digital baseband data from the digital IF ASIC 400 to ascertain pseudo-ranges as discussed more fully below.

The pseudo-ranges, along with any voice or data, is passed by the mobile demodulator 500 to the digital IF modulator 400. The digital IF modulator 400 provides a first stage IF up conversion of the data received from the mobile demodulator 500. A second stage of IF up conversion and RF up conversion of these signals is provided by the transmitter circuit 200. These signals are then transmitted to the base station 10 and processed in accordance with the method of the invention discussed below. It should be noted that location information to be communicated between the remote station 20 and the BSC 14, such as pseudo-ranges received by the remote station 20, are preferably communicated by the remote station 20 to the base station 10 via a data burst type message, such as short message service (SMS) defined by industry standard TIA/EIA/IS-167, published by the Telephone Industry Association. Such messages are transmitted through the base station 10 to the BSC 14. Alternatively, a newly defined burst type message could be transmitted by the remote station 20 to the base station 10.

Figure 5:
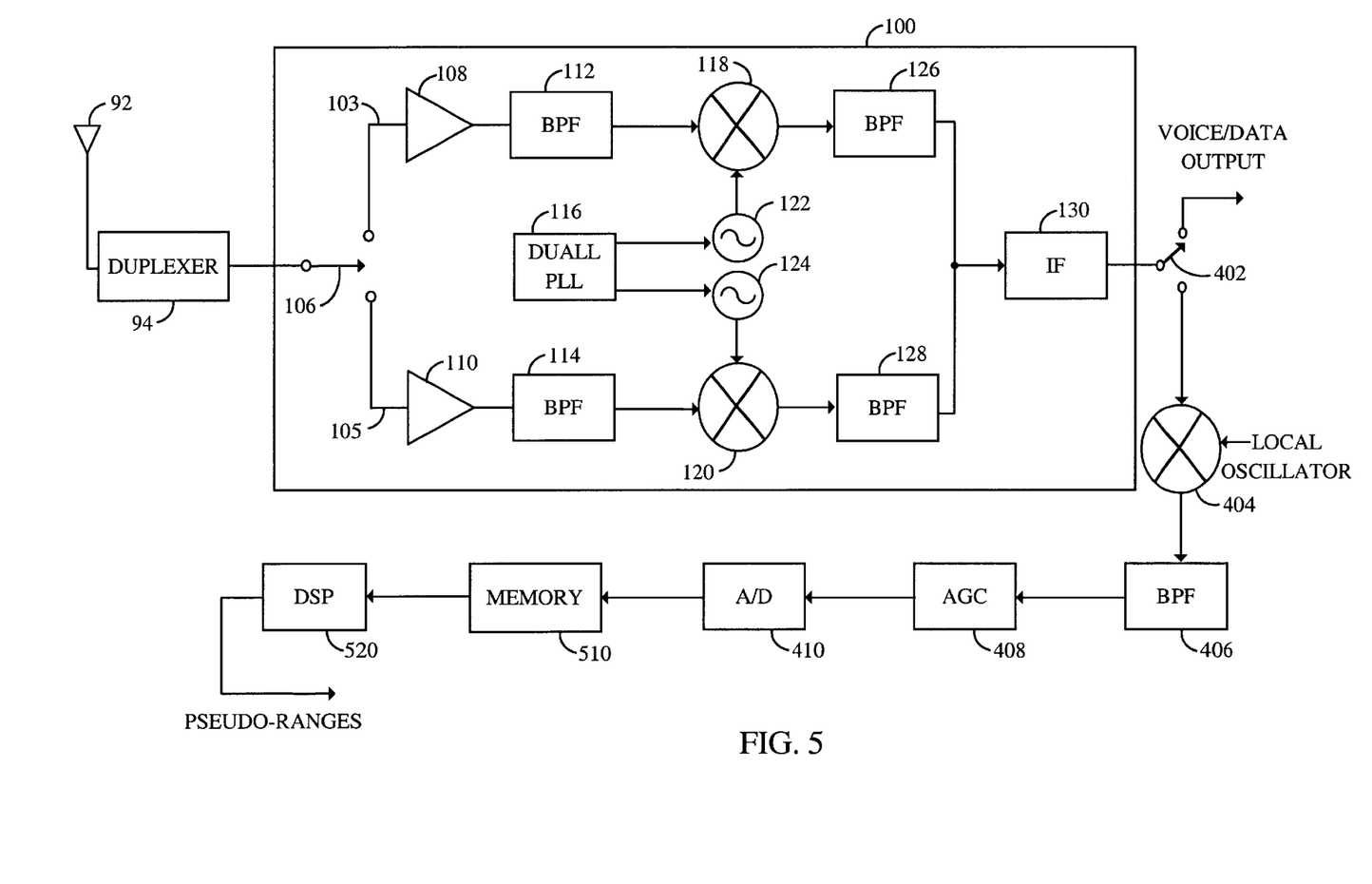
FIG. 5 is a block diagram of an showing an implementation of a portion of the receiver, control signal interface, digital IF, and wireless demodulator circuits of the remote station of the present invention.

FIG. 5 is a block diagram of an illustrative implementation of a portion of the receiver, control signal interface, digital IF, and mobile demodulator circuits of the remote station 20 of the present invention. The transmitter portion of the remote station 20 is essentially identical to the transmitter portion of a conventional remote station and therefore is not discussed herein for the sake of brevity. In the preferred embodiment, the receiver 100 is implemented with first and second paths 103 and 105, respectively, which are connected to the antenna 92 via the duplexer 94 via a first switch 106. It will be understood by those skilled in the art that more integration between the two-way communication device and the GPS receiver could take place. Alternatively, two separate receivers with an appropriate interface could achieve the objective of the present invention.

The first path 103 down converts received CDMA signals and provides conventional CDMA RF down converted output signals. The first path 103 includes a low noise amplifier 108, a first bandpass filter 112, a first mixer 118 and a second bandpass filter 126. The second path 105 downconverts GPS signals from the GPS satellites 60, 70, 80 or 90 of FIG. 1. The second path 105 includes a second low noise amplifier 110 which feeds a third bandpass filter 114. The output of the bandpass filter 114 is input to a second mixer 120. The output of the second mixer is fed to a fourth bandpass filter 128. The first and second mixers are fed by first and second local oscillators 122 and 124, respectively. The first and second local oscillators 122 and 124 operate at different frequencies under control of a dual phase locked loop (PLL) 116. The dual PLL insures that each local oscillator 122 and 124 maintains a reference frequency effective to down convert either a received CDMA signal, in the case of the first mixer 118, or a received GPS signal, in the case of the second mixer 120. The outputs of the second and fourth bandpass filters 126 and 128 are coupled to a first IF section 130 of conventional design.

The output of the IF demodulator 130 is input to a second switch 402 in the digital IF ASIC 400. The first and second switches 106 and 402 operate under control of the control signal interface 300 to divert a received signal for voice or data output processing in a conventional CDMA manner or GPS processing by a third mixer 404, fifth bandpass filter 406, an automatic gain control circuit 408 and an analog to digital converter 410. The second input to the third mixer 404 is a local oscillator output. The mixer 404 converts the applied signal to baseband. The filtered, gain controlled, signal is fed to an analog-to-digital converter ("A/D") 410. The output of the A/D 410 includes a first digital stream of in-phase (I) components and a second digital stream of quadrature components (Q). These digitized signals are fed to a digital signal processor 520, which processes the GPS signal and outputs the pseudo-range information required for position determination.

In an alternative embodiment of the present invention, the outputs from the two bandpass filters 126, 128 are fed to a baseband and application specific integrated circuit (ASIC) that digitally converts the IF frequency signals output from the baseband filters 126, 128 to baseband and outputs a stream of digital values that represent the quadrature and in-phase baseband signals. These signals are then applied to a searcher. The searcher is essentially identical to conventional searches used in CDMA demodulators. However, the searcher that is preferably used is programmable to allow the searcher to search for either a PN code associated with the CDMA signals transmitted from the base station or the PN code associated with the GPS satellites. The searcher discriminates between CDMA channels when receiving CDMA signals from the base station and determines the GPS satellite from which received GPS signals are being transmitted when in the GPS mode. In addition, once the GPS signals are acquired, the searcher indicates the time offset associated with the PN code essentially in a conventional manner in order to determine the pseudo range associated with satellites from which signals are being received, as will be understood by those skilled in the art.

It will be understood by those skilled in the art that a double conversion process, such as is shown in FIG. 5, or alternatively, a single conversion and IF sampling technique, could be used to produce the required I and Q samples. Furthermore, the structure of the embodiment shown in FIG. 5 may be altered in many ways that would not affect the operation of the present invention. For example, a conventional programmable processor may be used in place of the DSP that is shown in FIG. 5. The memory 510 may not be required if the rate at which data flows through the system is such that no buffers are required. The bandpass filter 406 and automatic gain control circuit 408 may be omitted under certain conditions, implemented using digital techniques or analog techniques, or other wise altered. Many other such variations to the structure that is shown in FIG. 5 may be made without altering the invention. Furthermore, it should be noted that an alternative embodiment may have greater or lesser sharing of hardware and software resources between the GPS and wireless receiver.

Figure 6:
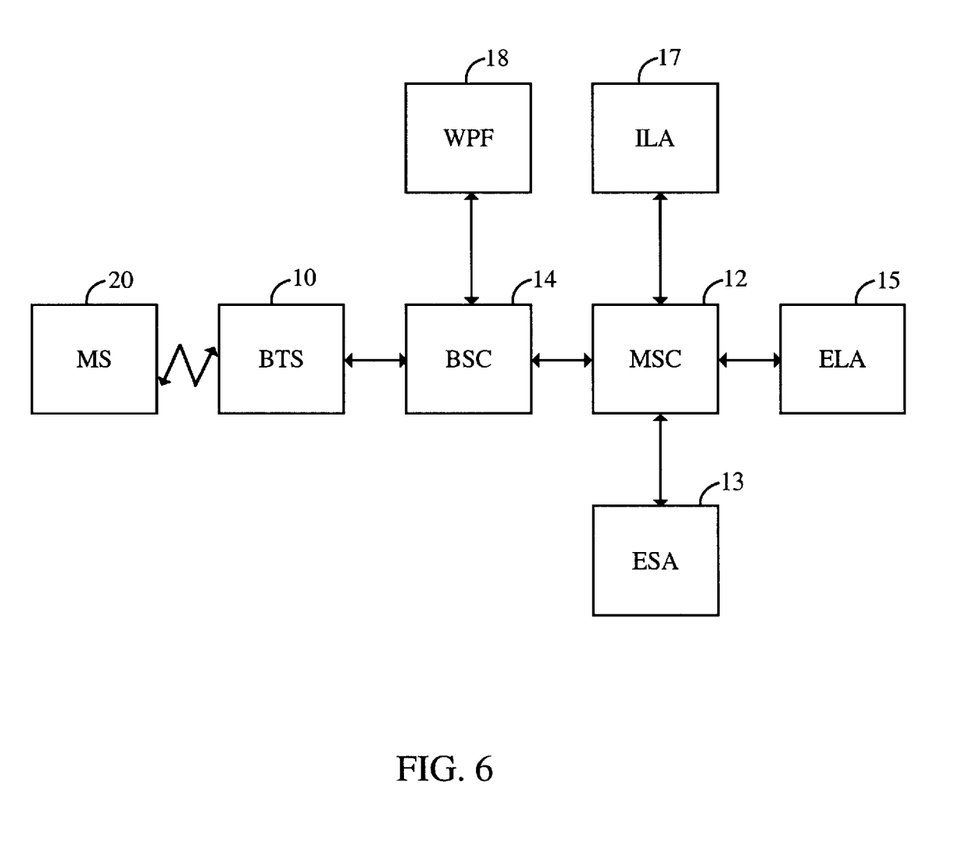
FIG. 6 illustrates of a functional model for determining the location of a remote station.

FIG. 6 is a high level block diagram of the components of a communication system which includes the present invention. In operation, in accordance with the inventive method, the WPF 18, using its own GPS receiver (not shown), gathers information relative to its own position and predicts the value of data relative to the base station 10. This information includes, but is not limited to, all of the satellites currently being viewed by the GPS transceiver 74 (FIG. 3), their elevation angle, Doppler shift, and pseudo ranges at a specific time. Note that the GPS receiver at the WPF 18 has up-to-date information on time of arrival, frequency, and PN offset of each satellite in view, because it is always tracking all satellites that are in view. Alternatively, the WPF 18 could predict satellite information corresponding to a subset of only those satellites that can be viewed by the remote station 20, assuming that the WPF 18 has stored information regarding the street width and height of the surrounding buildings. That is, if the WPF 18 has the ability to determine that the remote station will have an obstructed view of one or more satellites, then the WPF 18 will not predict satellite information regarding those satellites that are obstructed.

It should be noted that a conventional GPS receiver notes the time at which satellite signals are received with respect to the receiver's internal GPS clock. However, the receiver's internal GPS clock is not accurately synchronized to "true" GPS time. Therefore, the receiver cannot know the exact point in "true" GPS time at which the satellite signals are received. This situation is further described and mitigated in U.S. patent application Ser. No. 09/040,501 entitled "System and method for Determining The position of a wireless CDMA Transceiver," filed Mar. 17, 1998, assigned to the assignee of the present invention, and incorporated by reference herein.

The network described herein allows the position of a remote station to be determined at any time utilizing the WPF 18, shown in FIG. 2, as long as the remote station 20 is within the radio coverage area of the communication network, and as long as there is sufficient quality of service on the network. The process of determining the position of a remote station may be initiated by the remote station 20, the network, or an external entity, such as an internal location application (ILA) 17, an external location application (ELA) 15, or an emergency service application (ESA) 13, all shown in FIG. 6. Each of these components 13, 15, 17 may be either hardware or software which is capable of requesting and/or receiving location information. In one embodiment, the ILA 17 is a terminal coupled to the BSC 14 which allows an operator to directly request and receive location information regarding a remote station 20. Alternatively, the ILA 17 is a software application executed by a processor within the MSC 12.

The WPF 18 is preferably a conventional programmable processor capable of accepting raw data, such as the time of arrival of a reference pilot signal, GPS signals, and other signals. The WPF 18 uses these measurements to determine the location of the remote station. However, any device that is capable of performing the duties of the WPF 18 may be used. For example, the WPF 18 may be implemented as an ASIC, a discrete logic circuit, a state machine, or a software application within another network device (such as the BSC 14). Furthermore, it should be understood that the WPF 18 may be located within the base station 10, the BSC 14 as shown in FIG. 2, or elsewhere in the network. Conceptually speaking, the WPF 18 is a software application that may be executed by a dedicated processor that is in communication with the BSC 14. A conventional base station, BSC, or MSC need not be significantly modified in order to implement the present invention.

Despite the specific foregoing descriptions, ordinarily skilled artisans having the benefit of this disclosure will recognize that the apparatus discussed above may be implemented in a synchronous telecommunications system of different construction without departing from the scope of the present invention.

METHOD OF OPERATION

Various apparatus aspects of the present invention were disclosed above. To further facilitate an understanding of the invention, the method and article of manufacture implementations are discussed in this section.

Conventional wireless communication networks using GPS receivers use Time Of Arrival (TOA) measurements from four satellites to solve for the four unknowns (x, y, z, t), where t is the time bias in a user terminal clock. In contrast, most terrestrial based networks use Time Difference of Arrival (TDOA) to solve for the unknowns (x,y,z). Either method requires the remote station being located to be cognizant of the approximate GPS time. As shown in method 700 of FIG. 7, the present invention does not, although a remote station's knowledge of approximate GPS time may enhance performance of the present invention.

In this situation, where the remote station does not have an estimate of time, transferring accurate time to the remote station may require changes to the infrastructure and/or sending significant amount of data between the phone and a server through some data protocol. Even then, the time transfer process may not result in sufficient accuracy. Consequently, the remote station either cannot time stamp the measurements, or can only provide a very rough time stamp. If the time stamp is incorrect, the satellite locations will be computed at the incorrect time. This will cause an error in the computed location of the remote station.

Figure 7:
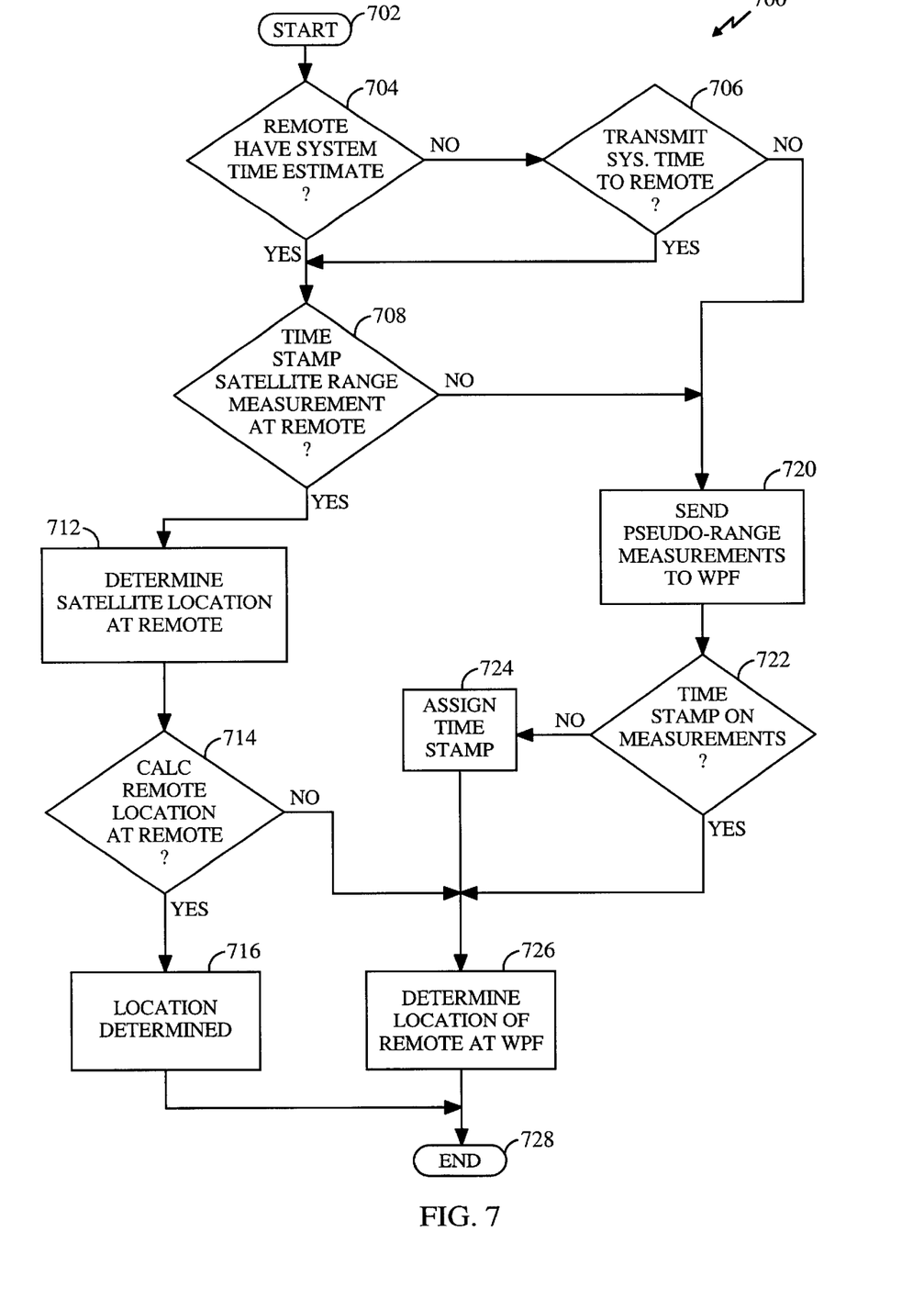
FIG. 7 shows a flow chart depicting a method to locate a remote station in accordance with the present invention.
Figure 8:
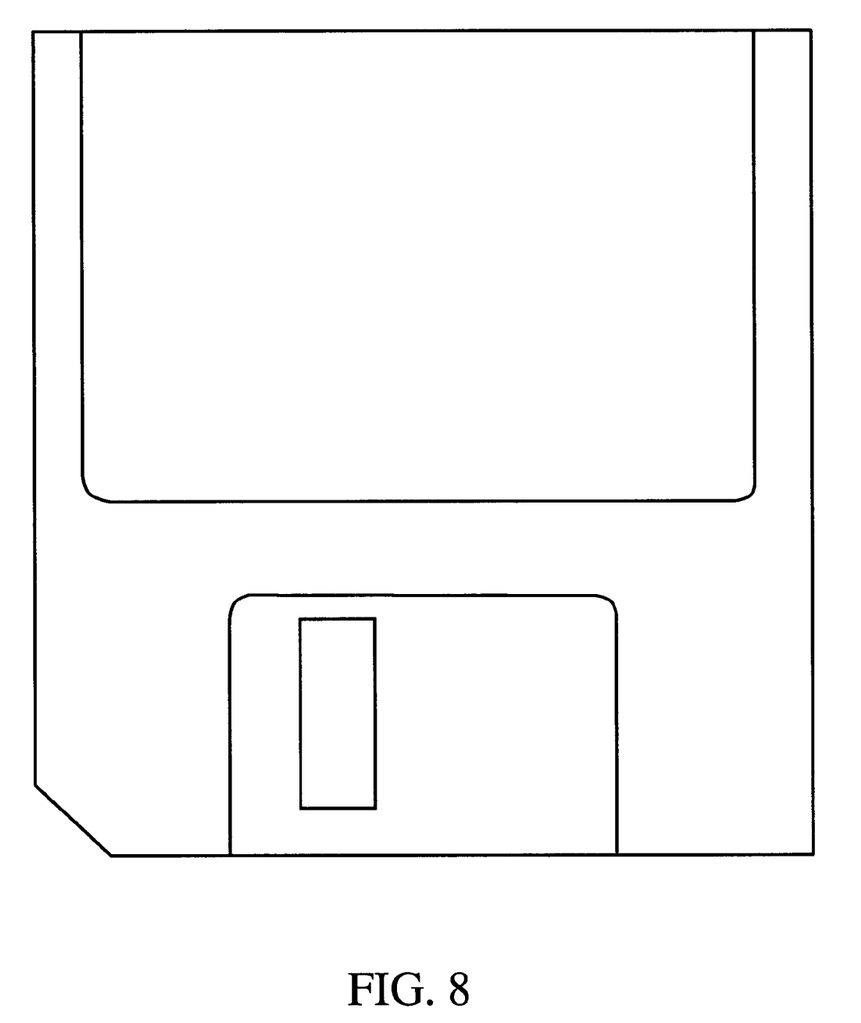
FIG. 8 shows an exemplary example of an article of manufacture in accordance with the present invention.

The present invention provides the method shown in FIG. 7 to solve this problem by recording the approximate time a satellite range measurement is made, commonly known as time stamping, either at the remote station or at the WPF 18 (FIG. 2). The difference between true GPS network time and this measurement time is treated as a variable "error" in measurement, the length of which is unknown. However, the method of the present invention allows this variable to be determined and used to find the physical location of a remote station operating in analog signal mode.

Time Stamping a Measurement

If the remote station has an approximate estimate of time, the remote station can time stamp a satellite range measurement in task 708 and either send them to WPF 18 in task 720, or compute the satellite location on its own in task 712. The approximate time estimate may be obtained by either transferring time to the remote station in task 706, or by the remote station retaining time from earlier occasions when it may have been on a network that facilitates accurate time transfers, for example, a IS-95 CDMA network.

If the remote station has no estimate of time, the remote station can send these range measurements to the WPF 18 without a time stamp. When the WPF 18 receives the measurements in task 722, the WPF 18 will assign a time stamp to the measurements in task 724. In this embodiment, time stamping of the measurement will take place at the WPF 18 after receiving the measurements from the remote station.

Solving for the Variable Error Inherent in a Time Stamp

The time stamp assigned to the measurements by any of the above methods may have a significant error: a few seconds or more. This error will result in an error in the computed location of the remote station. By treating the error in measurement time stamp as an unknown, and solving for this unknown, an accurate location for the remote station can be computed in spite of the erroneous time stamp. This requires that one additional satellite measurement, over the traditional four satellite measurements discussed above, be made. That is, the present method can determine the 3-dimensional location of a remote station using measurements from at least five satellites.

The error inherent in the approximate timestamp, and location of the remote station, is determined as follows. Let $(x_m, Y_m, Z_m)$ be the location of the remote station and let $(x_{si}(t), Y_{si}(t), Z_{si}(t))$ be the location of satellite $S_i$ at time t. Let $t_n$ be the "true GPS time" when the measurements were performed, and let b be the receiver bias modulo the PN roll (1 ms), where the value of $t_m$ is not related to that of b. Accordingly, measurements to each satellite, $\rho_i(t_m), i=1, \ldots, n$, can be expressed as:

$$\rho_i(t_m) = \sqrt{(x_{Si}(t_m) - x_m)^2 + (y_{Si}(t_m) - y_m)^2 + (z_{Si}(t_m) - z_m)^2} + b, \quad (1)$$

$$i = 1, \ldots, n$$

These measurements can be used to solve for the five unknowns $X_m, y_m, Z_m$ b and $t_m$. Obviously, because there are five unknowns, there must be at least five satellite measurements to solve for each unknown. To solve, a standard iterative least means squared (LMS) algorithm, an algorithm widely used by those schooled in the art, is used. At the $k^{th}$ iteration, the matrix row for measurement i will hold the derivatives with respect to each variable:

$$\frac{\partial \rho_i}{\partial x} = \frac{x_k - x_{Si}(t_k)}{\sqrt{(x_{Si}(t_k) - x_k)^2 + (y_{Si}(t_k) - y_k)^2 + (z_{Si}(t_k) - z_k)^2}} \quad (2)$$

$$\frac{\partial \rho_i}{\partial y} = \frac{y_k - y_{Si}(t_k)}{\sqrt{(x_{Si}(t_k) - x_k)^2 + (y_{Si}(t_k) - y_k)^2 + (z_{Si}(t_k) - z_k)^2}}$$

$$\frac{\partial \rho_i}{\partial z} = \frac{z_k - z_{Si}(t_k)}{\sqrt{(x_{Si}(t_k) - x_k)^2 + (y_{Si}(t_k) - y_k)^2 + (z_{Si}(t_k) - z_k)^2}} \quad i = 1, \ldots, n$$

$$\frac{\partial \rho_i}{\partial b} = 1$$

$$\frac{\partial \rho_i}{\partial t} = \frac{\left.\frac{\partial x_{Si}}{\partial t}\right|_{t=t_k}(x_{Si}(t_k) - x_k) + \left.\frac{\partial y_{Si}}{\partial t}\right|_{t=t_k}(y_{Si}(t_k) - y_k) + \left.\frac{\partial z_{Si}}{\partial t}\right|_{t=t_k}(z_{Si}(t_k) - z_k)}{\sqrt{(x_{Si}(t_k) - x_k)^2 + (y_{Si}(t_k) - y_k)^2 + (z_{Si}(t_k) - z_k)^2}}$$

The matrix as a whole is expressed as:

$$H = \begin{bmatrix} \frac{\partial \rho_{S1}}{\partial x} & \frac{\partial \rho_{S1}}{\partial y} & \frac{\partial \rho_{S1}}{\partial z} & \frac{\partial \rho_{S1}}{\partial b} & \frac{\partial \rho_{S1}}{\partial t} \\ \frac{\partial \rho_{S2}}{\partial x} & \frac{\partial \rho_{S2}}{\partial y} & \frac{\partial \rho_{S2}}{\partial z} & \frac{\partial \rho_{S2}}{\partial b} & \frac{\partial \rho_{S2}}{\partial t} \\ \vdots & \vdots & \vdots & \vdots & \vdots \\ \frac{\partial \rho_{Sn}}{\partial x} & \frac{\partial \rho_{Sn}}{\partial y} & \frac{\partial \rho_{Sn}}{\partial z} & \frac{\partial \rho_{Sn}}{\partial b} & \frac{\partial \rho_{Sn}}{\partial t} \end{bmatrix} \quad (3)$$

In one embodiment, an estimate of the remote station's position, known through information gather by the serving cell site, and an approximate estimate of time t will be known and used to further speed up the location determination, as shown in task 704.

Small Inherent Time Stamp Errors

In order to speed up location determination even further, if the time stamp error is known to be small, that is, less than a few seconds, the orbit of a satellite may be approximated by a straight line. Let $(x_m, y_m, z_m)$ be the location of the remote station. Let $t_0$ be the time stamp assigned by the remote station or the WPF 18 to the satellite range measurements. Let $t_1$ be the "true GPS time" when the measurements are performed. The error in the time stamp will be $\tau = (t_{1-t0})$. Let $(x_{si0}, Y_{si0}, z_{si0})$ be the location of satellite $S_i$ at time $t_0$, and let $k_{xi}$ be the rate of change of $X_{si}$. Let $k_{yi}$ be the rate of change of $Y_{si}$, and let $k_{zi}$ be the rate of change of $z_{si}$. Then the location of a satellite $S_i$ at a time $t_1$, can be closely approximated as $$x_{si1} \approx x_{si0} + k_{xi} \cdot \tau$$
$$y_{si1} \approx y_{si0} + k_{yi} \cdot \tau \quad (4)$$
$$z_{si1} \approx z_{si0} + k_{zi} \cdot \tau$$

Assume that the remote station made range measurements to n satellites at a time $t_1$. The range measurements can be written as:

$$\rho_i = \sqrt{(x_{si0} + k_{xi}\tau - x_m)^2 + (y_{si0} + k_{yi}\tau - y_m)^2 + (z_{si0} + k_{zi}\tau - z_m)^2} + b, \quad (5)$$
$$i = 1, \ldots, n$$

Where b is the bias in the remote station clock, and $\tau$ is the error inherent in assigning a time stamp. As in solving for the variable error inherent in a time stamp discussed above, the following are the measurements and the unknowns:

Measurements to Satellites: $\rho_i$, $i=1, \ldots, n$

Unknowns: $x_m, y_m, z_m, b, \tau$

Again, since there are five unknowns, the remote station must measure ranges to at least five satellites. The system represented by Equation (5) can be linearized and then solved using the LMS. To use LMS, the partial derivative of each measurement with respect to each unknown must be determined. The partial derivatives are:

$$\frac{\partial \rho_i}{\partial x_m} = \frac{x_m - (x_{si0} + k_{xi}\tau)}{\sqrt{(x_{si0} + k_{xi}\tau - x_m)^2 + (y_{si0} + k_{yi}\tau - y_m)^2 + (z_{si0} + k_{zi}\tau - z_m)^2}} \quad (6)$$

$$\frac{\partial \rho_i}{\partial y_m} = \frac{y_m - (y_{si0} + k_{yi}\tau)}{\sqrt{(x_{si0} + k_{xi}\tau - x_m)^2 + (y_{si0} + k_{yi}\tau - y_m)^2 + (z_{si0} + k_{zi}\tau - z_m)^2}}$$

$$\frac{\partial \rho_i}{\partial z_m} = \frac{z_m - (z_{si0} + k_{zi}\tau)}{\sqrt{(x_{si0} + k_{xi}\tau - x_m)^2 + (y_{si0} + k_{yi}\tau - y_m)^2 + (z_{si0} + k_{zi}\tau - z_m)^2}}$$

$$i = 1, \ldots, n$$

$$\frac{\partial \rho_i}{\partial b} = 1$$

$$\frac{\partial \rho_i}{\partial \tau} = \frac{x_{si0}k_{xi} + k_{xi}^2\tau - k_{xi}x_m + y_{si0}k_{yi} + k_{yi}^2\tau - k_{yi}y_m + z_{si0}k_{zi} + k_{zi}^2\tau - k_{zi}z_m}{\sqrt{(x_{si0} + k_{xi}\tau - x_m)^2 + (y_{si0} + k_{yi}\tau - y_m)^2 + (z_{si0} + k_{zi}\tau - z_m)^2}}$$

The problem in equation (4) and equation (5) can be expressed as a system of linear equations $$Hx = \rho \quad (7)$$

where x is a vector of unknowns:

$$x = \begin{bmatrix} x_m \\ y_m \\ z_m \\ b \\ \tau \end{bmatrix} \quad (8)$$

ρ is the vector of measurements:

$$\rho = \begin{bmatrix} \rho_1 \\ \rho_2 \\ \vdots \\ \rho_n \end{bmatrix} \quad (9)$$

and H is the design matrix, expressed as:

$$H = \begin{bmatrix} \frac{\partial \rho_1}{\partial x_m} & \frac{\partial \rho_1}{\partial y_m} & \frac{\partial \rho_1}{\partial z_m} & \frac{\partial \rho_1}{\partial b} & \frac{\partial \rho_1}{\partial \tau} \\ \frac{\partial \rho_2}{\partial x_m} & \frac{\partial \rho_2}{\partial y_m} & \frac{\partial \rho_2}{\partial z_m} & \frac{\partial \rho_2}{\partial b} & \frac{\partial \rho_2}{\partial \tau} \\ \vdots & \vdots & \vdots & \vdots & \vdots \\ \frac{\partial \rho_n}{\partial x_m} & \frac{\partial \rho_n}{\partial y_m} & \frac{\partial \rho_n}{\partial z_m} & \frac{\partial \rho_n}{\partial b} & \frac{\partial \rho_n}{\partial \tau} \end{bmatrix} \quad (10)$$

The system of linear equations Hx=ρ can now be solved using the well-known LMS techniques. In this embodiment, the range measurement to each satellite was made where the satellite's orbit was approximated using a straight line. This invention may also be used where the satellite orbit is approximated by a higher order curve.

Using the method described, whether or not it is known that there is a small inherent time stamp error, the location of the remote station, that is, the values for $x_m$, $y_m$, and $z_m$ may be determined at either the remote station in task 716 or at the WPF 18 in task 726. The method ends in task 728.

Article of Manufacture

A method as described above may be implemented, for example, by operating the WPF 18 to execute a sequence of machine-readable instructions. These instructions may reside in various types of signal-bearing media. In this respect, one aspect of the present invention concerns an article of manufacture comprising a signal-bearing media tangibly embodying a program of machine-readable instructions executable by a digital signal processor to perform a method to locate a transceiver used in a synchronous communications network employing wireless links.

This signal-bearing medium may comprise, for example, RAM (not shown) contained within the communications network. Alternatively, the instructions may be contained in another signal-bearing media, such as a magnetic data storage diskette 800 shown in FIG. 8, directly or indirectly accessible to the WPF 18 shown in FIG. 2. Whether contained within the communications network or elsewhere, the instructions may be stored on a variety of machine-readable data storage media, such as a direct access storage device, magnetic tape, electronic read-only memory, an optical storage device, or other suitable signal-bearing storage media. In an illustrative embodiment of the invention, the machine-readable instructions may comprise lines of compiled C, or C++, or other suitable coding language commonly used by those skilled in the programming arts.

OTHER EMBODIMENTS

While there have been shown what are presently considered to be preferred embodiments of the invention, it will be apparent to those skilled in the art that various changes and modifications can be made without departing from the scope of the invention as defined by the appended claims.

What is claimed is:

1. A method used to locate a remote station in a communications network employing wireless links, the network having a network time, the method comprising:
   receiving at the remote station signals from at least five satellites;
   measuring a range from the remote station to each of the at least five satellites;
   assigning a measurement time taken from an unsynchronized time source to each range measurement;
   determining the location of each of the at least five satellites; and
   determining the location of the remote station, the determination comprising using the ranges to, and the locations of, the at least five satellites.

2. The method in accordance with claim 1, wherein the measurement time is assigned by the remote station.

3. The method in accordance with claim 2, wherein the location of each at least five satellites is determined at the remote station, the remote station having access to satellite ephemeris.

4. The method in accordance with claim 3, wherein the remote station has access to an estimate of its location and an approximate network time.

5. The method in accordance with claim 1, wherein the measurement time is assigned by a wireless positioning function (WPF).

6. The method in accordance with claim 5, wherein the location of each at least five satellites is determined at the WPF, the WPF having access to satellite ephemeris.

7. The method in accordance with claim 6, wherein the WPF has access to an estimate of the remote station's location and an approximate network time.

8. An apparatus used to determine a location of a remote station in a communications network including a global positioning network (GPS) having at least five satellites, wherein the at least five satellites are communicatively coupled to the remote station, the apparatus comprising:
   a remote station including a remote station transceiver, the remote station transceiver capable of receiving a plurality of signals, the plurality of signals comprising at least signals transmitted from the at least five satellites;
   at least one base station communicatively coupled to the remote station and including a base station transceiver, the transceiver capable of transmitting signals to the remote station;
   a processor communicatively coupled to the communication network, the processor capable of:
     determining range measurements from the remote station to the at least five satellites;
     assigning a measurement time taken from an unsynchronized time source to each range measurement;
     determining the location of each of the at least five satellites; and
     determining the location of the remote station, the determination comprising using the ranges to, and the locations of, the at least five satellites.

9. The method in accordance with claim 8, wherein the processor is integral to the remote station.

10. The method in accordance with claim 8, wherein the processor is integral to a wireless positioning function (WPF), wherein the WPF is communicatively coupled to the at least one base station.

11. The apparatus in accordance with claim 10, wherein said at least one satellite is a global positioning network satellite.

12. The apparatus in accordance with claim 11, wherein said base station is a code division multiple access base station.

13. An article of manufacture embodying a program of machine-readable instructions executable by a digital signal processing apparatus to perform a method to locate a transceiver used in a synchronous communications network employing at least one satellite, said method comprising:

receiving at the remote station signals from at least five satellites;

measuring a range from the remote station to each of the at least five satellites;

assigning a measurement time taken from an unsynchronized time source to each range measurement; determining the location of each of the at least five satellites; and determining the location of the remote station, the determination comprising using the ranges to, and the locations of, the at least five satellites.

14. The article of manufacture in accordance with claim 13, wherein the measurement time is assigned by the remote station.

15. The article of manufacture in accordance with claim 14, wherein the location of each at least five satellites is determined at the remote station, the remote station having access to satellite ephemeris.

16. The article of manufacture in accordance with claim 15, wherein the remote station has access to an estimate of its location and an approximate network time.

17. The article of manufacture in accordance with claim 13, wherein the measurement time is assigned by a wireless positioning function (WPF).

18. The method in accordance with claim 17, wherein the location of each at least five satellites is determined at the WPF, the WPF having access to satellite ephemeris.

19. The article of manufacture in accordance with claim 18, wherein the WPF has access to an estimate of the remote station's location and an approximate network time.

20. An apparatus used to determine a location of a wireless transceiver in a communications network, comprising:

a remote station including a remote station transceiver means for receiving a plurality of signals, the plurality of signals comprising at least signals transmitted from the at least five satellites;

at least one base station communicatively coupled to the remote station and including a base station transceiver means for transmitting signals to and receiving signals from the remote station;

a means for processing digital signals and communicatively coupled to the communication network, the processing means capable of:

determining range measurements from the remote station to the at least five satellites;

assigning a measurement time taken from an unsynchronized time source to each range measurement;

determining the location of each of the at least five satellites; and determining the location of the remote station, the determination comprising using the ranges to, and the locations of, the at least five satellites.

* * * * *